UNITED STATES PATENT OFFICE.

THOMAS BUTLER, OF PATERSON, NEW JERSEY.

IMPROVEMENT IN WATER-PROOFING COMPOSITIONS.

Specification forming part of Letters Patent No. 155,856, dated October 13, 1874; application filed April 24, 1874.

*To all whom it may concern:*

Be it known that I, THOMAS BUTLER, of Paterson, in the county of Passaic and State of New Jersey, have invented a new and Improved Water-Proof Material, of which the following is a specification:

The nature of my invention consists in combining the ingredients hereinafter named in such a manner as to produce a water-proof material or composition that will, immediately after its application, become perfectly hard like stone, and absolutely impervious to water.

My invention, or "American asphalt," as I prefer to call it, is principally used on the floors of cellars and other places requiring a material perfectly water-proof. It may also be used with equal success on the walls of cellars and other places where a dry wall is desired. I have successfully used my American asphalt for the flooring of cellars where hides were salted, and where all other compositions in use for this purpose have failed. The salt had no effect upon my water-proof material.

My invention may be successfully used for the roadway of streets. It also can be used for cementing the joints of pipes, making the joint stronger than the pipe itself.

To enable others skilled in the art to which it relates to make and use my invention, I will proceed to describe the method of preparing and applying the same.

I usually mix the ingredients of my material in the following proportions: Three (3) barrels of chalk; three (3) barrels of coal-tar pitch; one (1) barrel of hydraulic cement, commonly known in commerce as "Rosendale cement;" one-half ($\frac{1}{2}$) barrel of iron-dust; fifty (50) pounds of saltpeter; and one (1) barrel of gravel.

The process of making my material is to put the pitch into an iron kettle, and then heat it to the boiling-point. While the pitch is boiling the chalk is put into the kettle, and these two ingredients are thoroughly combined. Then the iron-dust, cement, and saltpeter are placed in the kettle consecutively or simultaneously; but care should be taken to keep the pitch at the boiling-point, and that all these ingredients are thoroughly amalgamated. Then the gravel is gradually blended with the boiling compound.

My material is then taken from the kettle with an iron dipper and placed on the surface where desired. After laying a moment or two, smooth it over with a wooden float, sprinkling a little fine sand over it, meantime, to give a smooth surface, and also to prevent it from sticking to the float. As soon as it cools my water-proof material become perfectly hard.

Having now fully described the nature and extent of my invention, what I claim as new, and desire to secure by Letters Patent, is—

A composition or water-proof material, composed of the ingredients herein named, combined as described, suitable to be used for the purposes herein set forth.

In witness that I claim the foregoing I have hereunto set my hand this 15th day of April, 1874.

THOMAS BUTLER.

In presence of—
  PAUL J. VANDERBECK,
  MUNSON FORCE.